(12) United States Patent
Herle

(10) Patent No.: US 10,511,013 B2
(45) Date of Patent: Dec. 17, 2019

(54) ELECTROCHEMICAL CELL WITH PROTECTED NEGATIVE ELECTRODE

(71) Applicant: APPLIED MATERIALS, INC., Santa Clara, CA (US)

(72) Inventor: Subramanya P. Herle, Mountain View, CA (US)

(73) Assignee: Applied Materials, Inc., Santa Clara, CA (US)

(*) Notice: Subject to any disclaimer, the term of this patent is extended or adjusted under 35 U.S.C. 154(b) by 140 days.

(21) Appl. No.: 15/512,480

(22) PCT Filed: Sep. 23, 2015

(86) PCT No.: PCT/US2015/051759
§ 371 (c)(1),
(2) Date: Mar. 17, 2017

(87) PCT Pub. No.: WO2016/049213
PCT Pub. Date: Mar. 31, 2016

(65) Prior Publication Data
US 2017/0279108 A1 Sep. 28, 2017

Related U.S. Application Data

(60) Provisional application No. 62/054,267, filed on Sep. 23, 2014.

(51) Int. Cl.
*H01M 4/04* (2006.01)
*H01M 10/052* (2010.01)
(Continued)

(52) U.S. Cl.
CPC .......... *H01M 4/04* (2013.01); *H01M 4/0404* (2013.01); *H01M 4/045* (2013.01);
(Continued)

(58) Field of Classification Search
CPC ......... H01M 10/052; H01M 2004/027; H01M 4/04; H01M 4/0404; H01M 4/0423;
(Continued)

(56) References Cited

U.S. PATENT DOCUMENTS

| | | | |
|---|---|---|---|
| 5,494,762 A | 2/1996 | Isoyama et al. | |
| 6,358,643 B1 | 3/2002 | Katz et al. | |

(Continued)

FOREIGN PATENT DOCUMENTS

| | | | |
|---|---|---|---|
| JP | H06-290773 A | 10/1994 | |
| JP | H08-255610 A | 10/1996 | |

(Continued)

OTHER PUBLICATIONS

Cheng, X-B, et al., "Dendrite-Free Nanostructured Anode: Entrapment of Lithium in a 3D Fibrous Matrix for Ultra-Stable Lithium-Sulfur Batteries," Small 2014, 7 pages.

(Continued)

*Primary Examiner* — Adam A Arciero
(74) *Attorney, Agent, or Firm* — Pillsbury Winthrop Shaw Pittman LLP

(57) ABSTRACT

A method of fabricating a negative electrode for an electrochemical cell may comprise: providing an electrically conductive substrate; depositing a metal layer on the substrate; anodizing the metal layer to form a porous layer on the substrate; depositing a layer of ion conducting material on the porous layer, the layer extending at least partially into pores of the porous layer; densifying the layer of ion conducting material; depositing a layer of alkali metal on the densified layer of ion conducting material; attaching a temporary electrode to the layer of alkali metal and passing a current between the temporary electrode and the substrate to drive alkali metal through the densified layer of ion conducting material to the surface of the substrate, forming (Continued)

an alkali metal reservoir at the surface of the substrate. Furthermore, an electrically conductive mesh may be used in place of the porous layer on the substrate.

8 Claims, 4 Drawing Sheets

(51) Int. Cl.
*H01M 4/139* (2010.01)
*H01M 4/1395* (2010.01)
*H01M 4/38* (2006.01)
*H01M 4/66* (2006.01)
*H01M 4/74* (2006.01)
*H01M 4/02* (2006.01)

(52) U.S. Cl.
CPC ....... *H01M 4/0442* (2013.01); *H01M 4/0445* (2013.01); *H01M 4/139* (2013.01); *H01M 4/1395* (2013.01); *H01M 4/382* (2013.01); *H01M 4/667* (2013.01); *H01M 4/74* (2013.01); *H01M 10/052* (2013.01); *H01M 4/0423* (2013.01); *H01M 4/0471* (2013.01); *H01M 2004/027* (2013.01)

(58) Field of Classification Search
CPC .. H01M 4/0442; H01M 4/0445; H01M 4/045; H01M 4/0471; H01M 4/139; H01M 4/1395; H01M 4/382; H01M 4/667; H01M 4/74
See application file for complete search history.

(56) References Cited

U.S. PATENT DOCUMENTS

| | | |
|---|---|---|
| 6,376,123 B1 | 4/2002 | Chu |
| 6,402,795 B1 | 6/2002 | Chu et al. |
| 6,723,140 B2 | 4/2004 | Chu et al. |
| 6,911,280 B1 | 6/2005 | DeJonghe et al. |
| 6,955,866 B2 | 10/2005 | Nimon et al. |
| 2003/0162094 A1 | 8/2003 | Lee |
| 2007/0221265 A1 | 9/2007 | Affinito et al. |
| 2008/0003490 A1* | 1/2008 | Christensen ........ H01M 6/5005 429/61 |
| 2008/0050644 A1 | 2/2008 | Christensen et al. |
| 2008/0153000 A1 | 6/2008 | Salot et al. |
| 2009/0286114 A1 | 11/2009 | Visco et al. |
| 2011/0051322 A1* | 3/2011 | Pushparaj ............... C23C 16/24 361/525 |
| 2011/0165466 A1* | 7/2011 | Zhamu .................. B82Y 30/00 429/231.8 |
| 2013/0295452 A1 | 11/2013 | Ryu et al. |
| 2014/0162108 A1 | 6/2014 | Visco et al. |

FOREIGN PATENT DOCUMENTS

| | | |
|---|---|---|
| JP | 10-012279 A | 1/1998 |
| JP | 2000-173595 A | 6/2000 |
| KR | 10-2014-0070156 A | 6/2014 |
| WO | 00/60689 A1 | 10/2000 |
| WO | 2013/112135 A1 | 8/2013 |

OTHER PUBLICATIONS

Ding, F., et al., "Dendrite-Free Lithium Deposition via Self-Healing Electrostatic Shield Mechanism," JACS, Feb. 28, 2013, pp. 4450-4456.
Lu, Y., et al., "Stable Lithium Electrodeposition in Liquid and Nanoporous Solid Electrolytes," Nature Materials, vol. 13, Aug. 10, 2014, pp. 961-969.
Tu, Z., et al., "Nanoporous Polymer-Ceramic Composite Electrolytes for Lithium Metal Batteries," Advanced Energy Materials, vol. 4, 2014, 6 pages.
European Office Action, Office Action received for corresponding application EP 15844656.7, dated May 3, 2019, pp. 1-11.
Japanese Intellectual Property Office, Office Action in corresponding Japanese Patent Application No. 2017-515709, dated Aug. 20, 2019, pp. 1-12.

* cited by examiner

ELECTROCHEMICAL CELL WITH PROTECTED NEGATIVE ELECTRODE

CROSS REFERENCE TO RELATED APPLICATIONS

This application is a U.S. National Phase patent application of PCT/US2015/0051759, filed Sep. 23, 2015, which claims priority to U.S. Provisional Application No. 62/054,267 filed Sep. 23, 2014, both of which are hereby incorporated by reference in the present disclosure in their entirety herein.

FIELD

Embodiments of the present disclosure relate generally to electrochemical cells, and more specifically, although not exclusively, to protected negative electrodes.

BACKGROUND

A common mode of failure for lithium-based batteries is the growth of lithium dendrites which may grow to short the battery electrodes. Clearly, there is a need for alkali metal based battery cell designs which reduce the occurrence of dendrite formation.

SUMMARY

The present disclosure describes an electrochemical energy storage device, such as a battery, comprising a positive electrode and a negative electrode separated by a separator and an electrolyte which acts as an ionic conductive matrix, wherein the negative electrode is configured to reduce or eliminate the occurrence of alkali metal dendrite formation. The negative electrode may be fabricated with a densified ion conducting material which acts as the separator. Furthermore, the negative electrode may be configured as a protected alkali metal electrode.

According to some embodiments, a method of fabricating a negative electrode for an electrochemical cell may comprise: providing a substrate, the substrate being electrically conductive; depositing a metal layer on the substrate; anodizing the metal layer to form a porous layer on the substrate; depositing a layer of ion conducting material on the porous layer, the layer of ion conducting material extending at least partially into pores of the porous layer; densifying the layer of ion conducting material; depositing a layer of alkali metal on the densified layer of ion conducting material; attaching a temporary electrode to the layer of alkali metal and passing a current between the temporary electrode and the substrate to drive alkali metal through the densified layer of ion conducting material to the surface of the substrate, forming an alkali metal reservoir at the surface of the substrate.

According to some embodiments, a method of fabricating a negative electrode for an electrochemical cell may comprise: providing an electrically conductive mesh; depositing a layer of ion conducting material on the electrically conductive mesh, the layer of ion conducting material extending at least partially into holes of the electrically conductive mesh; densifying the layer of ion conducting material; depositing a layer of alkali metal on the densified layer of ion conducting material; and attaching a temporary electrode to the layer of alkali metal and passing a current between the temporary electrode and the electrically conductive substrate to drive alkali metal through the densified layer of ion conducting material to the surface of the electrically conductive mesh, forming an alkali metal reservoir at the surface of the electrically conductive mesh.

According to some embodiments, a method of fabricating a negative electrode for an electrochemical cell may comprise: providing an electrically conductive substrate; depositing a layer of ion conducting material on the electrically conductive substrate; densifying the layer of ion conducting material; depositing a layer of alkali metal on the densified layer of ion conducting material; and attaching a temporary electrode to the layer of alkali metal and passing a current between the temporary electrode and the electrically conductive mesh to drive alkali metal through the densified layer of ion conducting material to the surface of the electrically conductive substrate, forming an alkali metal reservoir at the surface of the electrically conductive substrate.

BRIEF DESCRIPTION OF THE DRAWINGS

These and other aspects and features of the present disclosure will become apparent to those ordinarily skilled in the art upon review of the following description of specific embodiments in conjunction with the accompanying figures, wherein.

DETAILED DESCRIPTION

Embodiments of the present disclosure will now be described in detail with reference to the drawings, which are provided as illustrative examples of the disclosure so as to enable those skilled in the art to practice the disclosure. The drawings provided herein include representations of devices and device process flows which are not drawn to scale. Notably, the figures and examples below are not meant to limit the scope of the present disclosure to a single embodiment, but other embodiments are possible by way of interchange of some or all of the described or illustrated elements. Moreover, where certain elements of the present disclosure can be partially or fully implemented using known components, only those portions of such known components that are necessary for an understanding of the present disclosure will be described, and detailed descriptions of other portions of such known components will be omitted so as not to obscure the disclosure. In the present specification, an embodiment showing a singular component should not be considered limiting; rather, the disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The present disclosure describes an electrochemical energy storage device, such as a battery, comprising a positive electrode and a negative electrode separated by a separator and an electrolyte which acts as an ionic conductive matrix, wherein the negative electrode is configured to reduce or eliminate the occurrence of lithium metal dendrite formation. Furthermore, the negative electrode may be configured as a protected lithium electrode.

Figure 1:
FIGS. 1-5 are schematic cross-sectional representations of a first negative electrode fabrication process, according to some embodiments.
Figure 2:
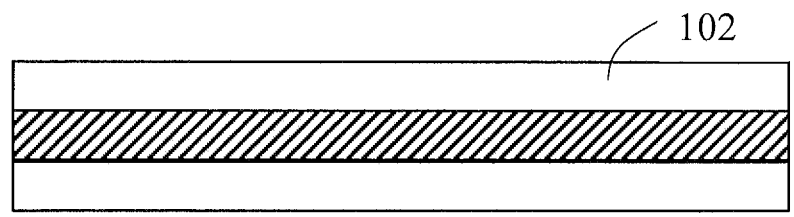
Figure 3:
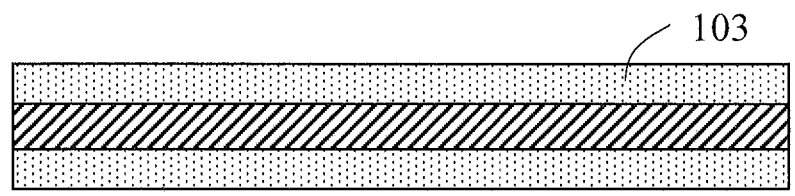

FIGS. 1-3 show the fabrication of a first embodiment of a negative electrode. In FIG. 1 a substrate 101, which can also be a current collector formed of, for example, copper, stainless steel, or a dielectric material such as glass coated with electrically conductive material, is provided. In FIG. 2, the substrate is coated with an ion conducting material 102 such as garnet (LLZO (LiLaZr oxide), LLZTO (LiLaZrTa oxide)), sulfide (LGPS ($Li_{10}GeP_2S_{12}$), $Li_3PS_4$), antiperovskites (doped $Li_3OX$, X=halogen), LiPON, suitable polymers materials and/or suitable polymer/gel materials, etc.; the coating may be deposited on one or both sides of the substrate, and may be deposited using a deposition technique such as PVD, plasma spray, thermal spray, green tape deposition, etc. In FIG. 3 the ion conducting material is densified to form a densified ion conducting material 103, using a method such as firing, sintering, laser or furnace annealing, RTP, etc. The densified ion conducting material should be free of pinholes or has high aspect ratio pores to inhibit dendrite growth. The negative electrode shown in FIG. 3 may be taken and combined with a positive electrode, which may in embodiments be deposited directly on the negative electrode. The densified ion conducting material 103 on the negative electrode acts as an ion conducting separator in the resulting battery. In this embodiment the lithium metal comes from the positive electrode. The positive electrode can be printed/coated on an Al current collector with or without liquid electrolyte and the active material can be blended with Li-conducting solid electrolyte to reduce the liquid electrolyte in the positive electrode. Thus the electrochemical cell assembly may have reduced liquid electrolyte on the positive electrode and on the negative electrode side there is no liquid electrolyte. In addition, the positive electrode may be patterned to reduce tortuosity and obtain higher charge rate performance.

Figure 4:
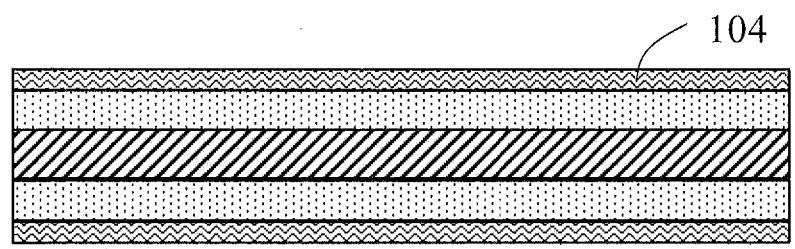
Figure 5:
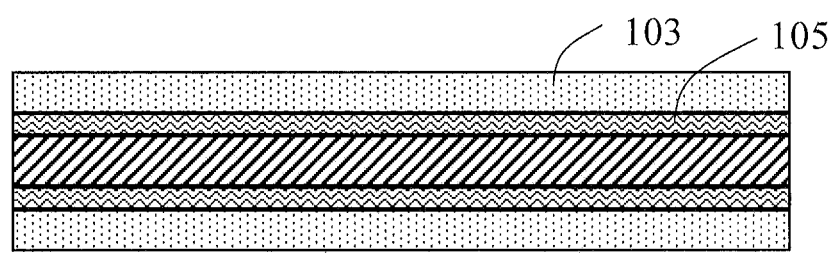

Furthermore, the processing of the negative electrode of FIG. 3 may be continued as shown in FIGS. 4-5. In FIG. 4, lithium metal 104 is deposited on the densified ion conducting material 103. (Note that for safety reasons, the lithium metal deposition area is made smaller than the area of the surface of the ion conducting material on to which it is deposited the lithium metal is kept away from the edges.) In FIG. 5, a temporary electrode (not shown), formed of copper for example, is attached to the lithium covered top surface of the densified ion conducting material so that a current may be passed between the temporary electrode and the substrate/current collector so as to drive the lithium 104 through the densified ion conducting material 103 to the surface of the substrate/current collector 101 where a lithium reservoir 105 is formed. A mixed ionically and electrically conductive oxide can be deposited in between the layer of densified ion conducting material and the layer of lithium metal so that all of the lithium can be effectively moved electrochemically to the interface between the substrate and the densified ion conducting material. The negative electrode of FIG. 5 may be taken and combined with a positive electrode, such as described above, to form a battery. Note that in the embodiment of FIG. 5, the lithium reservoir is protected being separated from the surface of the negative electrode by a layer of ion conducting material which may be effective in protecting the lithium from oxidizing elements/compounds in the environment, which makes handling of the negative electrode easier.

According to some embodiments, a negative electrode for an electrochemical cell may comprise: an electrically conductive substrate; a densified layer of ion conducting material on the electrically conductive substrate; a layer of alkali metal on the densified layer of ion conducting material; and an alkali metal reservoir at the surface of the electrically conductive substrate, the alkali metal reservoir having been formed by attaching a temporary electrode to the layer of alkali metal and passing a current between the temporary electrode and the electrically conductive substrate to drive alkali metal through the densified layer of ion conducting material to the surface of the electrically conductive substrate.

Figure 6:
FIGS. 6-11 are schematic cross-sectional representations of a second negative electrode fabrication process, according to some embodiments.
Figure 7:
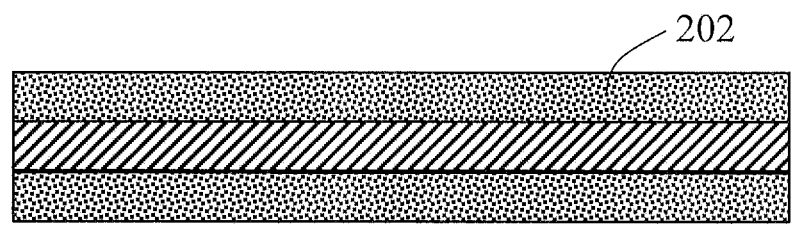
Figure 8:
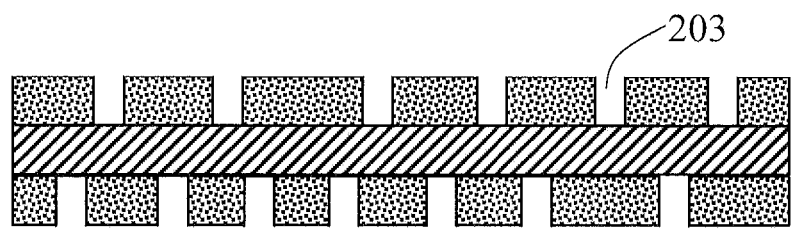
Figure 9:
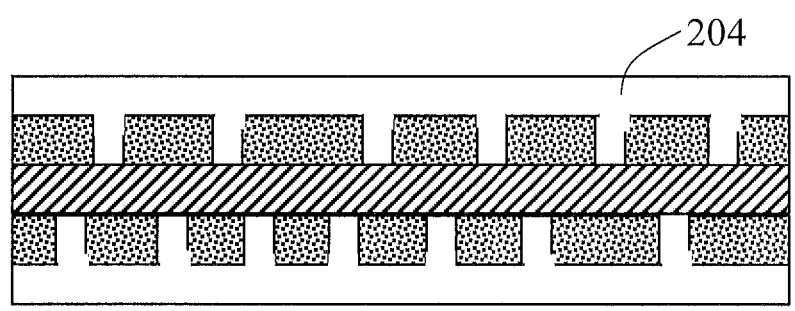
Figure 10:
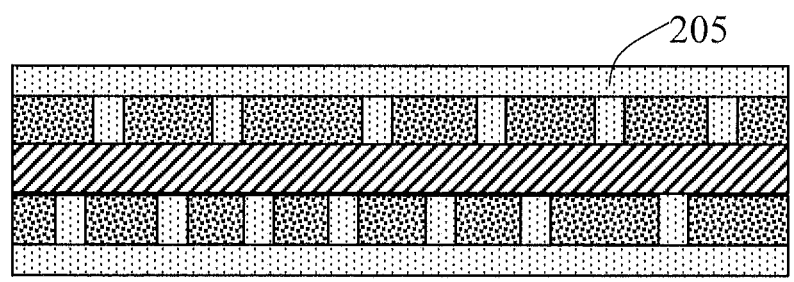

FIGS. 6-11 show the fabrication of a second embodiment of a negative electrode. In FIG. 6 a substrate 201, which can also be a current collector formed of, for example, copper, stainless steel, or a dielectric material such as glass coated with electrical conductive material, is provided. In FIG. 7 the substrate is coated with a metal 202 suitable for forming a porous layer, such as aluminum, zirconium or titanium; the coating may be deposited on one or both sides of the substrate, and may be deposited using a deposition technique such as PVD. In FIG. 8, the metal is anodized to form a porous layer 203. The pores may extend only part way or all the way through the thickness of the metal layer; the pores are typically nanometer scale (sub-10 s to 100 s of nanometers in diameter, in embodiments in the range of 10 nm to 500 nm), and may have either low or high density. The porous layer is typically in the range of 1 to 10 microns thick and in embodiments 2 to 5 microns thick. In FIG. 9, the porous layer is coated with an ion-conducting material 204 such as garnet (LLZO, LLZTO), sulfide (LGPS, $Li_3PS_4$), antiperovskites (doped $Li_3OX$, X=halogen) UPON, suitable polymers materials and/or suitable polymer/gel materials, etc. The coating 204 is deposited at least partially into the pores using PVD, thermal evaporation, thermal spray, e-beam evaporation, chemical solution deposition or chemical vapor deposition. In FIG. 10 the ion conducting material is densified to form a densified ion conducting material 205, using a method such as firing, sintering, laser or furnace annealing, RTP, etc. The densified ion conducting material in embodiments is free of pinholes or has high aspect ratio pores to inhibit dendrite growth. The negative electrode shown in FIG. 10 may be taken and combined with a positive electrode such as described above, which may in embodiments be deposited directly on the negative electrode; in this embodiment the lithium metal comes from the positive electrode.

Figure 11:
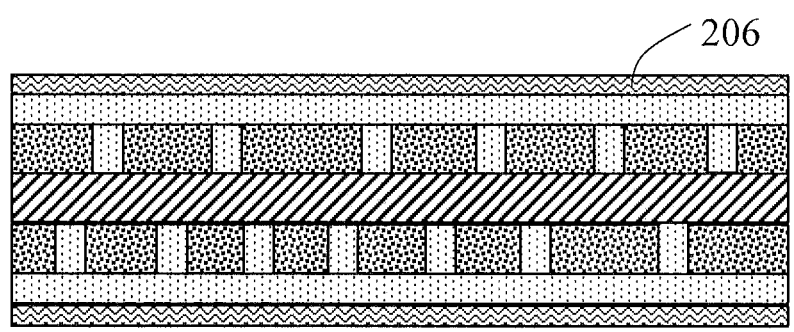
Figure 12:
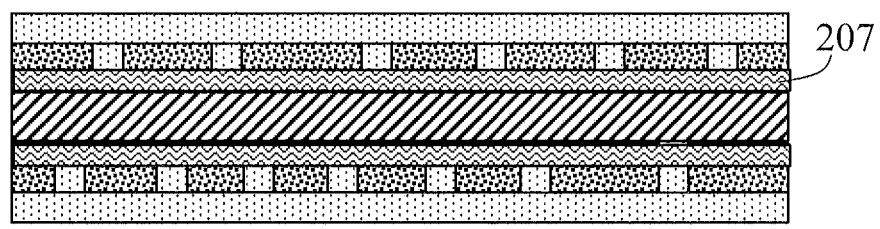
FIG. 12 shows the structure of FIG. 11 after movement of lithium metal to the substrate when porous layer 203 is a lithium ion conductor, according to some embodiments.
Figure 13:
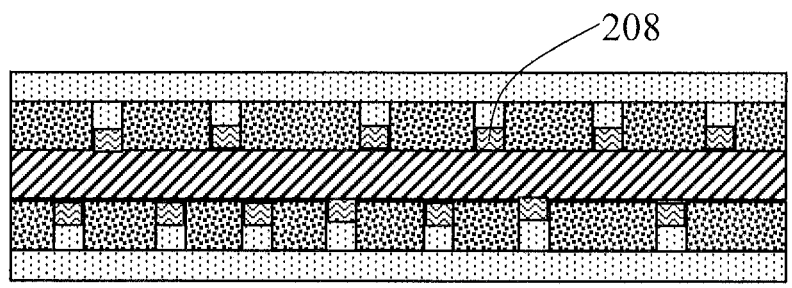
FIG. 13 shows the structure of FIG. 11 after movement of lithium metal to the substrate when porous layer 203 is not a lithium ion conductor, according to some embodiments.

Furthermore, the processing of the negative electrode of FIG. 10 may be continued as shown in FIGS. 11-13. In FIG. 11 lithium metal 206 is deposited on the densified ion conducting material 205. (Note that for safety reasons, the lithium metal deposition area is made smaller than the area of the surface of the ion conducting material on to which it is deposited the lithium metal is kept away from the edges.) In FIGS. 12 & 13, a temporary electrode (not shown), formed of copper for example, is attached to the lithium covered top surface of the densified ion conducting material so that a current may be passed between the temporary electrode and the substrate/current collector so as to drive the lithium 206 through the densified ion conducting material 205 to the surface of the substrate/current collector 201 where a lithium reservoir 207/208 is formed. Note that FIG. 12 shows the result for the embodiment in which the anodized metal is an ion conductor for example when the metal is zirconium or titanium, and the porous layer is formed of $ZrO_x$ or $TiO_x$, respectively and FIG. 13 shows the result for the embodiment in which the anodized metal is not an ion conductor, but for which lithium may move along the surface of the pores for example when the metal is aluminum and the porous layer is formed of $Al_2O_3$. The negative electrode of FIG. 12 or 13 may be taken and combined with a positive electrode to form a battery. Note that in the embodiment of FIGS. 12 & 13, the lithium reservoir is protected being separated from the surface of the negative electrode by a layer of ion conducting material which may be effective in protecting the lithium from oxidizing elements/compounds in the environment, which makes handling of the negative electrode easier.

According to some embodiments, a negative electrode for an electrochemical cell may comprise: a substrate, the substrate being electrically conductive; a porous anodized metal layer on the substrate; a densified layer of ion conducting material on the porous layer, the layer of ion conducting material extending at least partially into pores of the porous layer; a layer of alkali metal on the densified layer of ion conducting material; and an alkali metal reservoir at the surface of the substrate, the alkali metal reservoir having been formed, for example, by attaching a temporary electrode to the layer of alkali metal and passing a current between the temporary electrode and the substrate to drive alkali metal through the densified layer of ion conducting material to the surface of the substrate.

Figure 14:
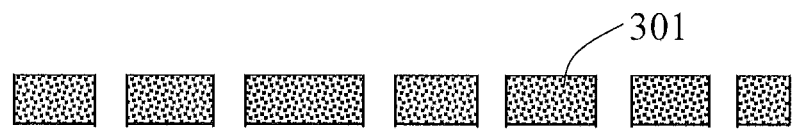
FIGS. 14 & 15 are schematic cross-sectional representations of a third negative electrode fabrication process, according to some embodiments.
Figure 15:
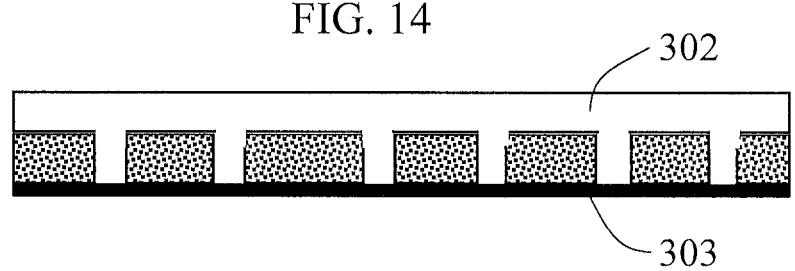

FIGS. 14-15 show the fabrication of a third embodiment of a negative electrode. In FIG. 14 a substrate 301, formed of a mesh such as a glass fiber mesh, a ceramic fiber mesh or a polymer mesh, is provided. In FIG. 15, the substrate is coated with an ion-conducting material 302 such as garnet (LLZO, LLZTO), sulfide (LGPS, $Li_3PS_4$), and/or antiperovskites (doped $Li_3OX$, X=halogen); the coating is deposited on the top side of the mesh substrate, and may be deposited using a deposition technique such as PVD, plasma spray, thermal spray, green tape deposition, thermal evaporation, e-beam evaporation, chemical solution deposition or chemical vapor deposition, etc. Furthermore, a thin layer of metal 303, such as copper metal is deposited on the back side of the mesh already coated on the other side with ion conducting material 302. This structure may then go through densification as described above and then be used as a negative electrode either with a without a lithium reservoir. Note that this embodiment provides a flexible electrode.

According to some embodiments, a method of fabricating a negative electrode for an electrochemical cell may comprise: providing a mesh, such as a glass fiber mesh, a ceramic fiber mesh or a polymer mesh; depositing a layer of ion conducting material on the front side of the mesh, the layer of ion conducting material extending at least partially into holes of the mesh; after the depositing the layer of ion conducting material, depositing a layer of metal on the back side of the mesh; densifying the layer of ion conducting material; depositing a layer of alkali metal on the densified layer of ion conducting material; and attaching a temporary electrode to the layer of alkali metal and passing a current between the temporary electrode and the layer of metal to drive alkali metal through the densified layer of ion conducting material to the surface of the layer of metal on the back side of the mesh, forming an alkali metal reservoir at the surface of the layer of metal.

Furthermore, in embodiments an electrically conductive mesh may be used to replace the structure of FIG. 8 in the above fabrication process, although it should be noted that the holes in the mesh are typically micron-scale (sub-10 s to 100 s of microns in diameter, in embodiments in the range of one micron to one hundred microns) whereas the pores in the anodized metal are typically nanometer-scale.

According to some embodiments, a negative electrode for an electrochemical cell may comprise: an electrically conductive mesh; a layer of densified ion conducting material on the electrically conductive mesh, the layer of ion conducting material extending at least partially into holes of the electrically conductive mesh; a layer of alkali metal on the densified layer of ion conducting material; and an alkali metal reservoir at the surface of the electrically conductive mesh, the alkali metal reservoir having been formed, for example, by attaching a temporary electrode to the layer of alkali metal and passing a current between the temporary electrode and the electrically conductive mesh to drive alkali metal through the densified layer of ion conducting material to the surface of the electrically conductive mesh. In embodiments the electrically conductive mesh may comprise a mesh such as a glass fiber mesh, a ceramic fiber mesh or a polymer mesh, for example, coated with a layer of metal on the side of the mesh opposite to the layer of ion conducting material, as shown in FIG. 15.

Furthermore, it should be noted that the negative electrodes with the porous substrate, such as the embodiments of FIGS. 8-15, are expected to exhibit improved stress handling due to battery cycling (repeated movement of lithium to and from the negative electrode during charging and discharging cycles) when compared with negative electrodes without a porous substrate.

Figure 16:
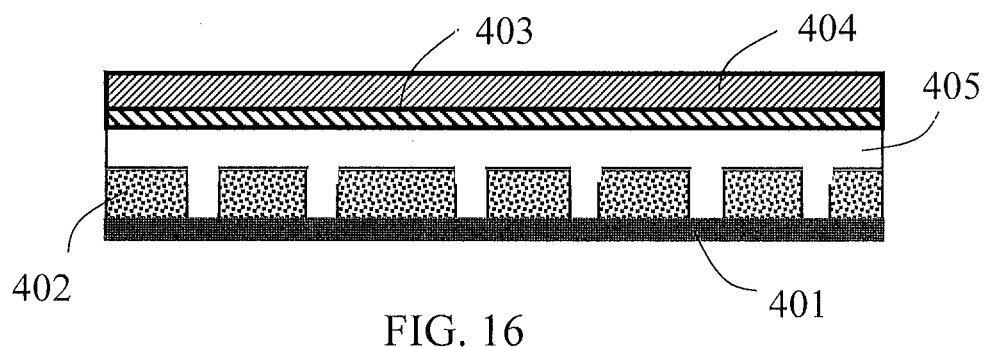
FIG. 16 is a schematic cross-sectional representation of a further negative electrode structure, according to some embodiments.

In further embodiments, a method of fabricating an electrochemical cell may comprise depositing one or more metals, such as Al, on a separator 401, such as a poly-olefin separator, and anodizing the layer of metal to form an anodized layer 402 with vertically aligned nanopores that inhibit dendrite growth, thus forming a protective sheet, and laminating this protective sheet to a lithium metal 403 coated current collector layer 404, such as a copper layer, with the anodized metal facing the lithium. Furthermore, in embodiments the protective sheet can be coated with an ion conducting material 405 which is deposited at least partially into the pores (and the ion conducting material may be densified) prior to lamination, such that the ion conducting material is facing lithium, helping prevent dendrite formation. The ion conducting material may be one or more of the ion conducting materials provided as examples for embodiments described above, and may be deposited and densified using methods and equipment as described above. FIG. 16 shows the resulting negative electrode structure with the ion conducting material.

According to some embodiments, a method of fabricating a negative electrode for an electrochemical cell may comprise: providing a separator; depositing a metal layer on the separator; anodizing the metal layer to form a porous layer on the separator; depositing a layer of ion conducting material on the porous layer, the layer of ion conducting material extending at least partially into pores of the porous layer; densifying the layer of ion conducting material, forming a protective sheet; and laminating a current collector layer coated with a layer of alkali metal to the protective sheet, the alkali metal facing the densified ion conducting material. In embodiments the alkali metal is lithium.

According to some embodiments, a negative electrode for an electrochemical cell may comprise: a separator; a porous layer of anodized metal on said separator; a layer of densified ion conducting material on the porous layer, the layer of densified ion conducting material extending at least partially into pores of the porous layer; a layer of alkali metal on said densified ion conducting material; and a current collector on the layer of alkali metal. In embodiments the alkali metal is lithium.

Although embodiments of the present disclosure have been particularly described with reference to lithium negative electrodes, the principles and teaching of the present disclosure also apply to other alkali metal negative electrodes, such as sodium or potassium, for example.

Although embodiments of the present disclosure have been particularly described with reference to certain embodiments thereof, it should be readily apparent to those of ordinary skill in the art that changes and modifications in the form and details may be made without departing from the spirit and scope of the disclosure.

What is claimed is:

1. A method of fabricating a negative electrode for an electrochemical cell, comprising:
    providing a substrate, said substrate being electrically conductive;
    depositing a metal layer on said substrate;
    anodizing said metal layer to form a porous layer on said substrate;
    depositing a layer of ion conducting material on said porous layer, said layer of ion conducting material extending at least partially into pores of said porous layer;
    densifying said layer of ion conducting material;
    depositing a layer of alkali metal on the densified layer of ion conducting material;
    attaching a temporary electrode to said layer of alkali metal and passing a current between said temporary electrode and said substrate to drive alkali metal through the densified layer of ion conducting material to the surface of said substrate, forming an alkali metal reservoir at the surface of said substrate.

2. The method of claim 1, wherein said alkali metal is lithium metal.

3. The method of claim 1, wherein said metal layer is chosen from the group consisting of aluminum, zirconium and titanium.

4. The method of claim 1, wherein said pores are nanometer-scale pores.

5. The method of claim 1, wherein said substrate is glass coated in electrically conductive material.

6. The method of claim 1, wherein said depositing said metal layer comprises physical vapor deposition of said metal layer.

7. The method of claim 1, wherein said depositing said layer of ion conducting material comprises physical vapor deposition of said ion conducting material.

8. The method of claim 1, wherein said densifying said layer of ion conducting material comprises furnace annealing said layer of ion conducting material.

* * * * *